(12) United States Patent
Kim et al.

(10) Patent No.: US 10,277,375 B2
(45) Date of Patent: Apr. 30, 2019

(54) METHOD AND APPARATUS FOR TRANSMITTING ACK/NACK SIGNALS USING MULTIPLE ANTENNA PORTS

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 14/774,090

(22) PCT Filed: Mar. 19, 2014

(86) PCT No.: PCT/KR2014/002303
§ 371 (c)(1),
(2) Date: Sep. 9, 2015

(87) PCT Pub. No.: WO2014/148810
PCT Pub. Date: Sep. 25, 2014

(65) Prior Publication Data
US 2016/0020886 A1    Jan. 21, 2016

Related U.S. Application Data

(60) Provisional application No. 61/803,436, filed on Mar. 19, 2013.

(51) Int. Cl.
| | | |
|---|---|---|
| *H04L 5/00* | (2006.01) | |
| *H04W 72/04* | (2009.01) | |
| *H04W 88/02* | (2009.01) | |

(52) U.S. Cl.
CPC .......... *H04L 5/0055* (2013.01); *H04L 5/0007* (2013.01); *H04W 72/044* (2013.01);
(Continued)

(58) Field of Classification Search
CPC ......................... H04L 5/0007; H04W 72/044
See application file for complete search history.

(56) References Cited

U.S. PATENT DOCUMENTS

| | | |
|---|---|---|
| 2012/0051404 A1 | 3/2012 | Hu et al. |
| 2013/0188569 A1* | 7/2013 | He ........................ H04W 28/16 370/329 |

(Continued)

FOREIGN PATENT DOCUMENTS

| | | |
|---|---|---|
| KR | 10-2010-0056962 | 5/2010 |
| KR | 10-2013-0018137 | 2/2013 |

(Continued)

OTHER PUBLICATIONS

PCT International Application No. PCT/KR2014/002303, Written Opinion of the International Searching Authority dated Jun. 20, 2014, 9 pages.

(Continued)

*Primary Examiner* — Derrick W Ferris
*Assistant Examiner* — Jay L Vogel
(74) *Attorney, Agent, or Firm* — Lee Hong Degerman Kang Waimey

(57) ABSTRACT

A method for transmitting and receiving a signal by a terminal in a wireless communication system, according to one embodiment of the present invention, comprises the steps of: transmitting uplink data to a base station; and receiving an acknowledgement of reception of the uplink data, wherein a first area, to which the acknowledgement of reception is transmitted, is determined in such a manner that a difference value between the number of REs, to which a first antenna port is allocated, and the number of REs, to which a second antenna port is allocated, is a predetermined value or less.

6 Claims, 19 Drawing Sheets

(52) U.S. Cl.
CPC .......... *H04L 5/0023* (2013.01); *H04L 5/0048* (2013.01); *H04W 88/02* (2013.01)

(56) References Cited

U.S. PATENT DOCUMENTS

| | | | | |
|---|---|---|---|---|
| 2013/0201926 A1* | 8/2013 | Nam | ...................... | H04L 1/1685 370/329 |
| 2014/0198730 A1* | 7/2014 | Khoshnevis | ...... | H04W 72/0413 370/329 |
| 2014/0348077 A1* | 11/2014 | Chen | ...................... | H04W 72/12 370/329 |
| 2015/0036606 A1* | 2/2015 | Ji | .......................... | H04L 5/0026 370/329 |

FOREIGN PATENT DOCUMENTS

| | | |
|---|---|---|
| WO | 2012/108928 | 8/2012 |
| WO | 2013/022326 | 2/2013 |

OTHER PUBLICATIONS

PCT International Application No. PCT/KR2014/002303, Written Opinion of the International Searching Authority dated Jun. 20, 2014, 13 pages.

\* cited by examiner

FIG. 6
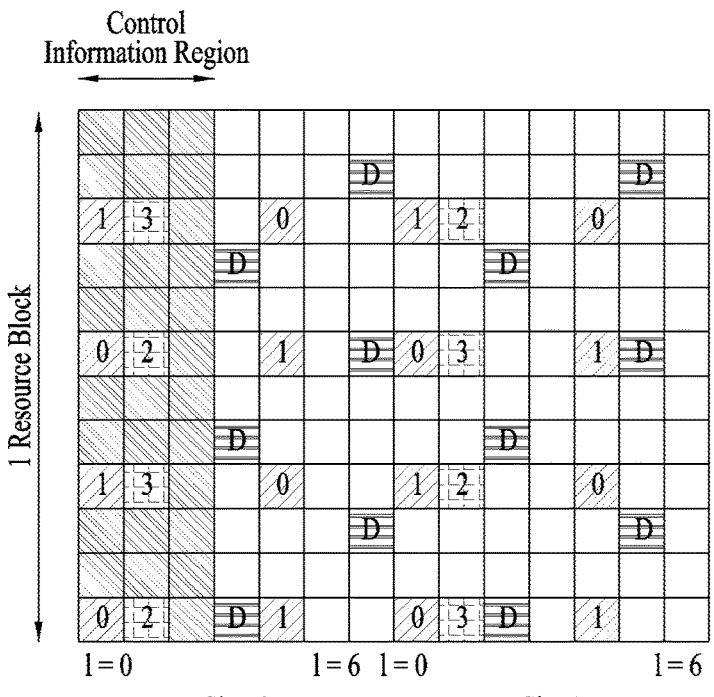
(a)
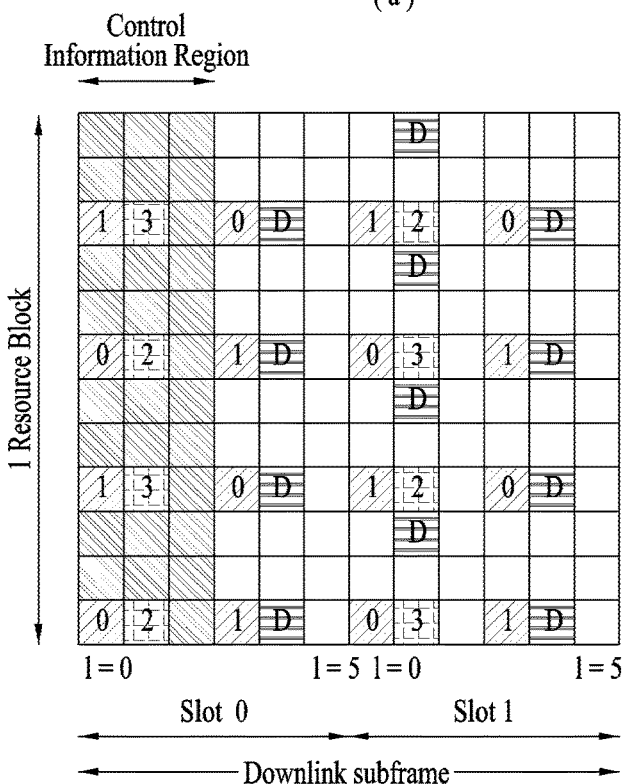
(b)

FIG. 7
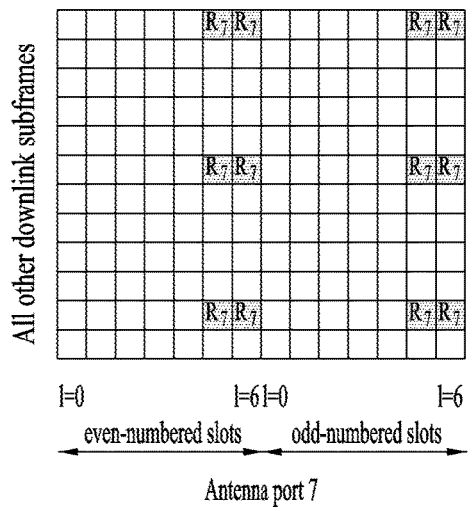
Antenna port 7
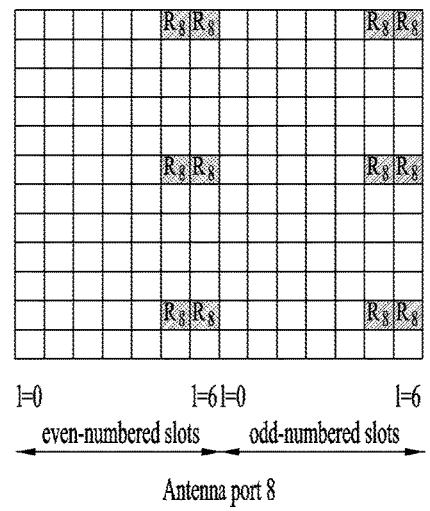
Antenna port 8
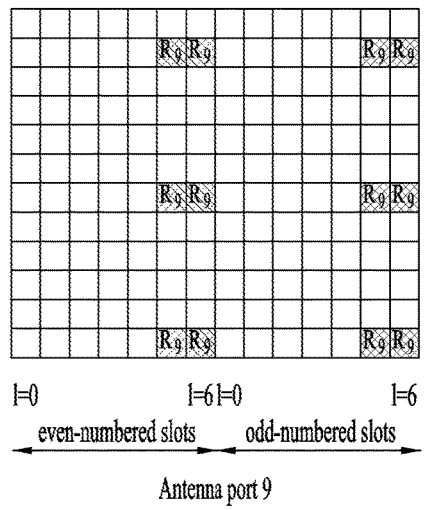
Antenna port 9
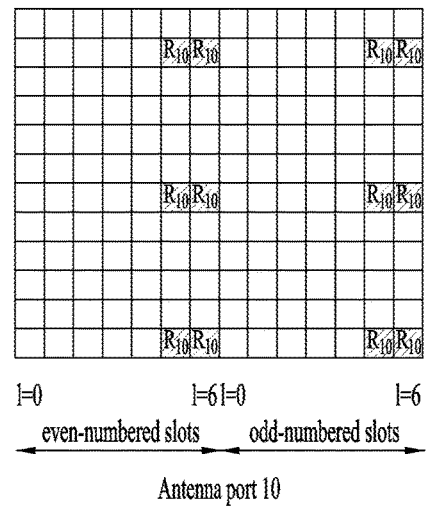
Antenna port 10

FIG. 8

EREG index

PRB pair #0

| 0 | 4 | 8 | 12 |
|---|---|---|----|
| 1 | 5 | 9 | 13 |
| 2 | 6 | 10 | 14 |
| 3 | 7 | 11 | 15 |

PRB pair #1

| 0 | 4 | 8 | 12 |
|---|---|---|----|
| 1 | 5 | 9 | 13 |
| 2 | 6 | 10 | 14 |
| 3 | 7 | 11 | 15 |

PRB pair #2

| 0 | 4 | 8 | 12 |
|---|---|---|----|
| 1 | 5 | 9 | 13 |
| 2 | 6 | 10 | 14 |
| 3 | 7 | 11 | 15 |

PRB pair #3

| 0 | 4 | 8 | 12 |
|---|---|---|----|
| 1 | 5 | 9 | 13 |
| 2 | 6 | 10 | 14 |
| 3 | 7 | 11 | 15 |

Distributed PRB set

PRB pair #0

| 0 | 1 | 5 | 9 | 13 |
|---|---|---|---|----|
|   | 2 | 6 | 10 | 14 |
|   | 3 | 7 | 11 | 15 |
|   | 0 | 4 | 8 | 12 |

(shaded: 0)

| 1 | 5 | 9 | 13 |
| 2 | 6 | 10 | 14 |
| 3 | 7 | 11 | 15 |
| 0 | 4 | 8 | 12 |

PRB pair #1

| 0 | 4 | 8 | 12 | (0 shaded) |
| 1 | 5 | 9 | 13 |
| 2 | 6 | 10 | 14 |
| 3 | 7 | 11 | 15 |

PRB pair #2

| 2 | 6 | 10 | 14 |
| 1 | 5 | 9 | 13 |
| 0 | 4 | 8 | 12 | (0 shaded) |
| 3 | 7 | 11 | 15 |

PRB pair #3

| 3 | 7 | 11 | 15 |
| 2 | 6 | 10 | 14 |
| 1 | 5 | 9 | 13 |
| 0 | 4 | 8 | 12 | (0 shaded) |

FIG. 9
| | Symbol | | | | | | | | | | | | | |
|---|---|---|---|---|---|---|---|---|---|---|---|---|---|---|
| RE | 0 | 1 | 2 | 3 | 4 | 5 | 6 | 7 | 8 | 9 | 10 | 11 | 12 | 13 |
| 0 | 7 | 7 | 9 | 7 | 9 | | | 7 | 9 | 7 | 7 | 9 | | |
| 1 | 7 | 7 | 9 | 7 | 9 | | | 7 | 9 | 7 | 7 | 9 | | |
| 2 | 7 | 7 | 9 | 7 | 9 | 9 | 7 | 7 | 9 | 7 | 7 | 9 | 7 | 7 |
| 3 | 7 | 7 | 9 | 7 | 9 | 9 | 7 | 7 | 9 | 7 | 7 | 9 | 7 | 7 |
| 4 | 7 | 9 | 9 | 7 | 9 | 9 | 7 | 7 | 9 | 7 | 9 | 9 | 7 | 7 |
| 5 | 7 | 9 | 9 | 7 | 9 | | | 7 | 9 | 7 | 9 | 9 | | |
| 6 | 7 | 9 | 9 | 7 | 9 | | | 7 | 9 | 7 | 9 | 9 | | |
| 7 | 7 | 9 | 9 | 7 | 9 | 9 | 7 | 7 | 9 | 7 | 9 | 9 | 7 | 7 |
| 8 | 7 | 9 | 7 | 7 | 9 | 7 | 7 | 9 | 9 | 7 | 9 | 7 | 7 | 7 |
| 9 | 7 | 9 | 7 | 7 | 9 | 7 | 7 | 9 | 9 | 7 | 9 | 7 | 7 | 7 |
| 10 | 7 | 9 | 7 | 7 | 9 | | | 9 | 9 | 7 | 9 | 7 | | |
| 11 | 7 | 9 | 7 | 7 | 9 | | | 9 | 9 | 7 | 9 | 7 | | |
 REs for (legacy) DM-RS
 EPHICH region FIG. 14
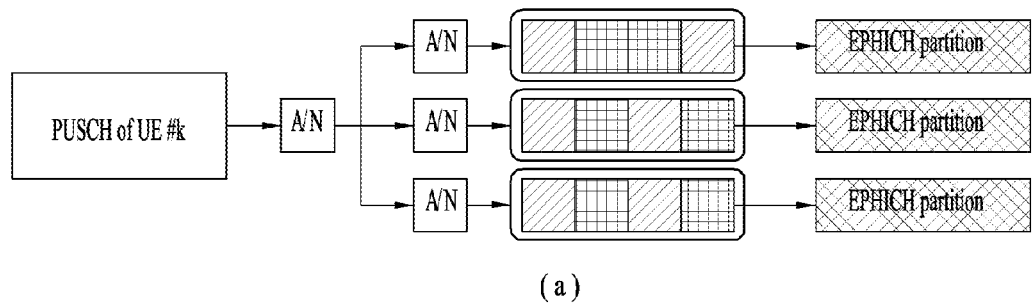
(a)
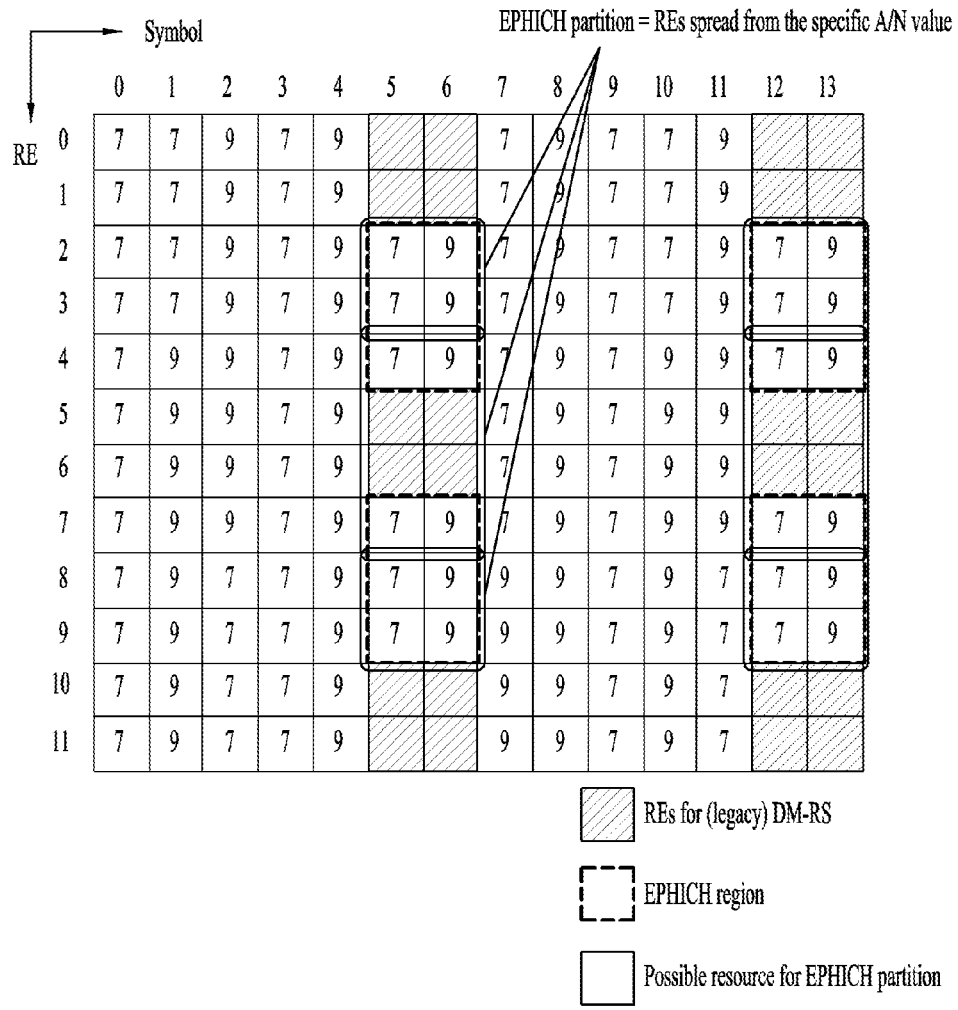
(b)

FIG. 15
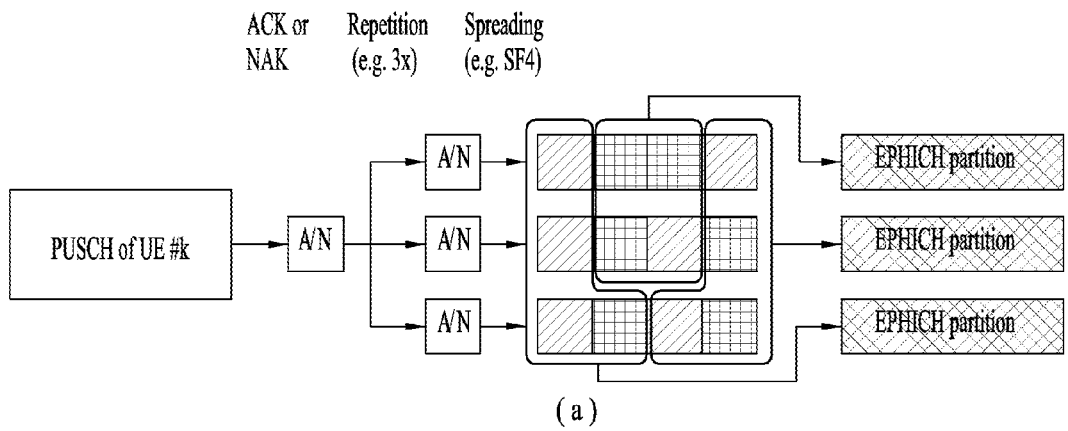
(a)
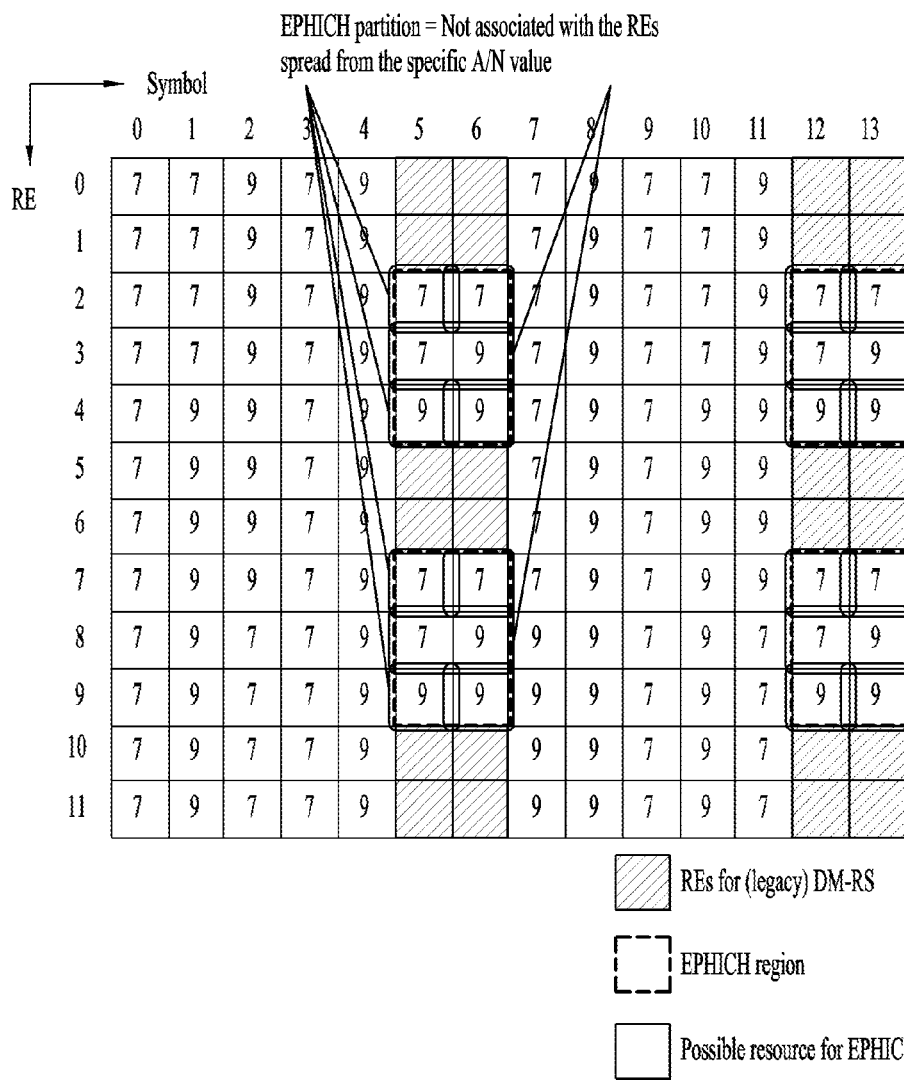
(b)

METHOD AND APPARATUS FOR TRANSMITTING ACK/NACK SIGNALS USING MULTIPLE ANTENNA PORTS

CROSS-REFERENCE TO RELATED APPLICATIONS

This application is the National Stage filing under 35 U.S.C. 371 of International Application No. PCT/KR2014/002303, filed on Mar. 19, 2014, which claims the benefit of U.S. Provisional Application No. 61/803,436, filed on Mar. 19, 2013, the contents of which are all hereby incorporated by reference herein in their entirety.

TECHNICAL FIELD

The present invention relates to a wireless communication system, and more particularly, to a method and apparatus for transmitting and receiving a signal related to an Enhanced Physical Hybrid automatic repeat request Indicator Channel (EPHICH).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide a resource region for an EPHICH, antenna ports, and a disclosure related to the antenna ports.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method of transmitting and receiving a signal by a user equipment in a wireless communication system comprising: transmitting uplink data to a base station; and receiving an acknowledgement (ACK)/non-acknowledgement (NACK) for the uplink data, wherein a first region via which the ACK/NACK is transmitted, is determined in such a manner that a difference value between a number of resource elements (Res) to which a first antenna port is allocated, and a number of REs to which a second antenna port is allocated, is less than or equals to a predetermined value.

In a second technical aspect of the present invention, a user equipment in a wireless communication system comprises a reception module; and a processor, wherein the processor configured to transmit uplink data to a base station and receives an acknowledgement (ACK)/non-acknowledgement (NACK) for the uplink data, and wherein a first region via which the ACK/NACK is transmitted, is determined in such a manner that a difference value between a number of resource elements (Res) to which a first antenna port is allocated, and a number of REs to which a second antenna port is allocated, is less than or equals to a predetermined value.

The first technical aspect and the second technical aspects of the present invention may include one or more of the followings.

The REs to which a first antenna port is allocated and the REs to which a second antenna port is allocated may exclude REs included in the first region, among available REs for an Enhanced Physical Downlink Control Channel (EPDCCH), on a Physical Resource Block (PRB) pair.

The difference value between the number of REs to which a first antenna port is allocated and the number of REs to which a second antenna port is allocated may less than or equal to a predetermined value if a Channel State Information-Reference Signal (CSI-RS) is transmitted on the PRB pair.

Antenna ports may be allocated to the REs included in the first region depending on a number of PRB pairs in which an Enhanced Physical Hybrid automatic repeat request Indicator Channel (EPHICH) group is distributed.

If the EPHICH group is distributed in n umber of PRB pairs and one EPHICH group is comprised of k number of REs, the first antenna port and the second antenna port may uniformly be allocated to k/n number of REs corresponding to the EPHICH group, among the REs included in the first region.

The k/n number of REs may include REs continuous on one of a time domain or a frequency domain, if symbols spread from one ACK/NACK symbol are mapped into the k/n number of REs corresponding to the EPHICH group.

The k/n number of REs may include REs spaced apart from each other as much as one or more subcarriers, if symbols spread from one ACK/NACK symbol are mapped into the k/n number of REs corresponding to the EPHICH group.

The EPHICH group may include 12 REs.

The first region may be located on orthogonal frequency division multiplexing (OFDM) symbols #5, #6, #12 and #13.

The first antenna port and the second antenna port may be related to distributed EPDCCH transmission.

The available REs for the EPDCCH may exclude REs for a predetermined signal.

The predetermined signal may include a demodulation reference signal (DMRS).

Advantageous Effects

According to an EPHICH according to the embodiment of the present invention, transmission and reception of acknowledgement and non-acknowledgment may be performed with antenna port balancing of an EPDCCH.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a reference signal;

FIG. 7 is a diagram illustrating a demodulation reference signal;

FIG. 8 is a diagram illustrating EREG (Enhanced Resource Element Group) to ECCE (Enhanced Control Channel Element) mapping;

FIG. 9 is a diagram illustrating antenna port mapping related to an EPDCCH;

FIGS. 10 to 16 are diagrams illustrating an EPHICH according to the first embodiment of the present invention;

FIGS. 17 to 19 are diagrams illustrating an EPHICH according to the second embodiment of the present invention.

BEST MODE FOR CARRYING OUT THE INVENTION

Figure 1:
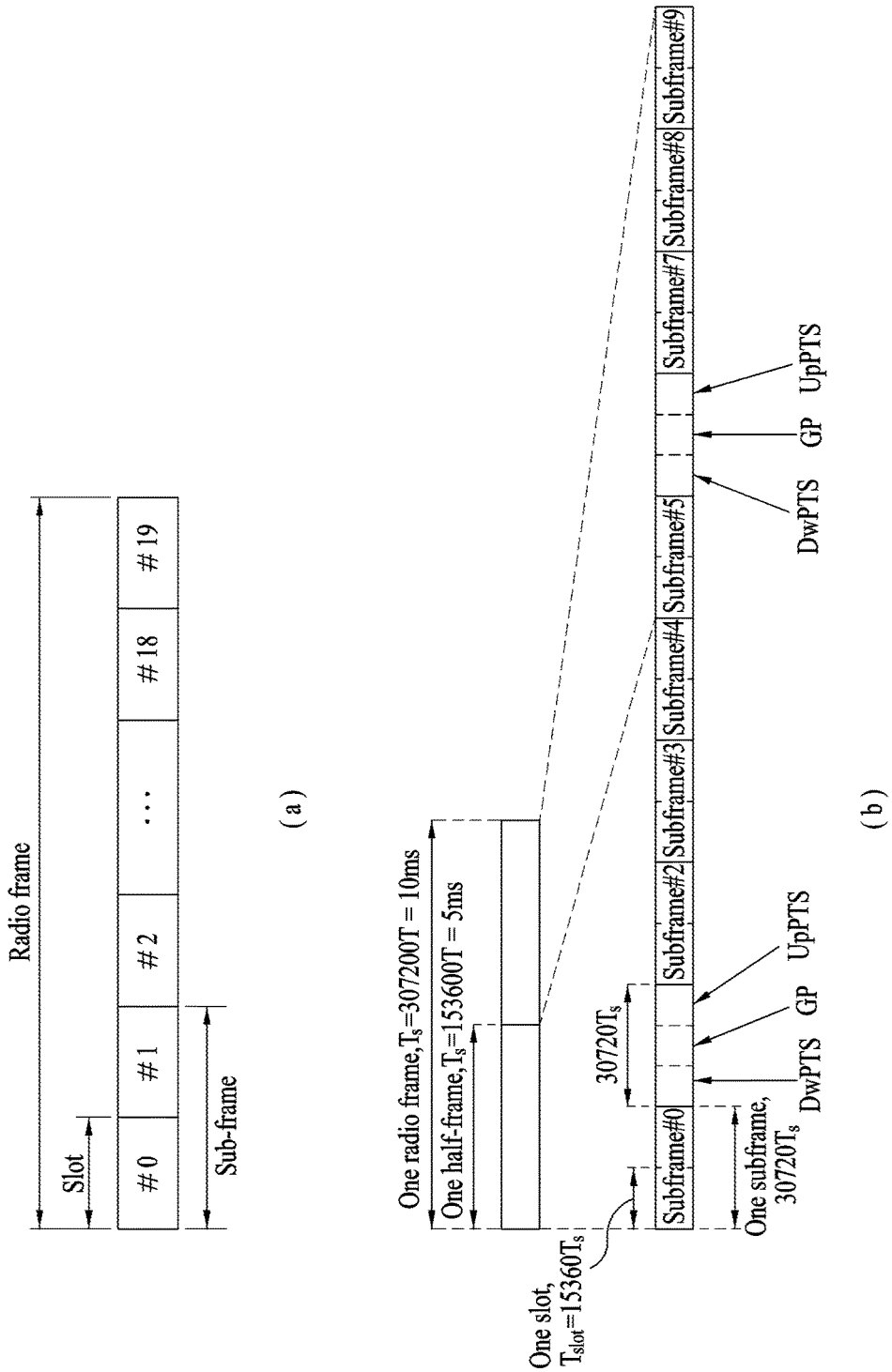
FIG. 1 is a diagram illustrating a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
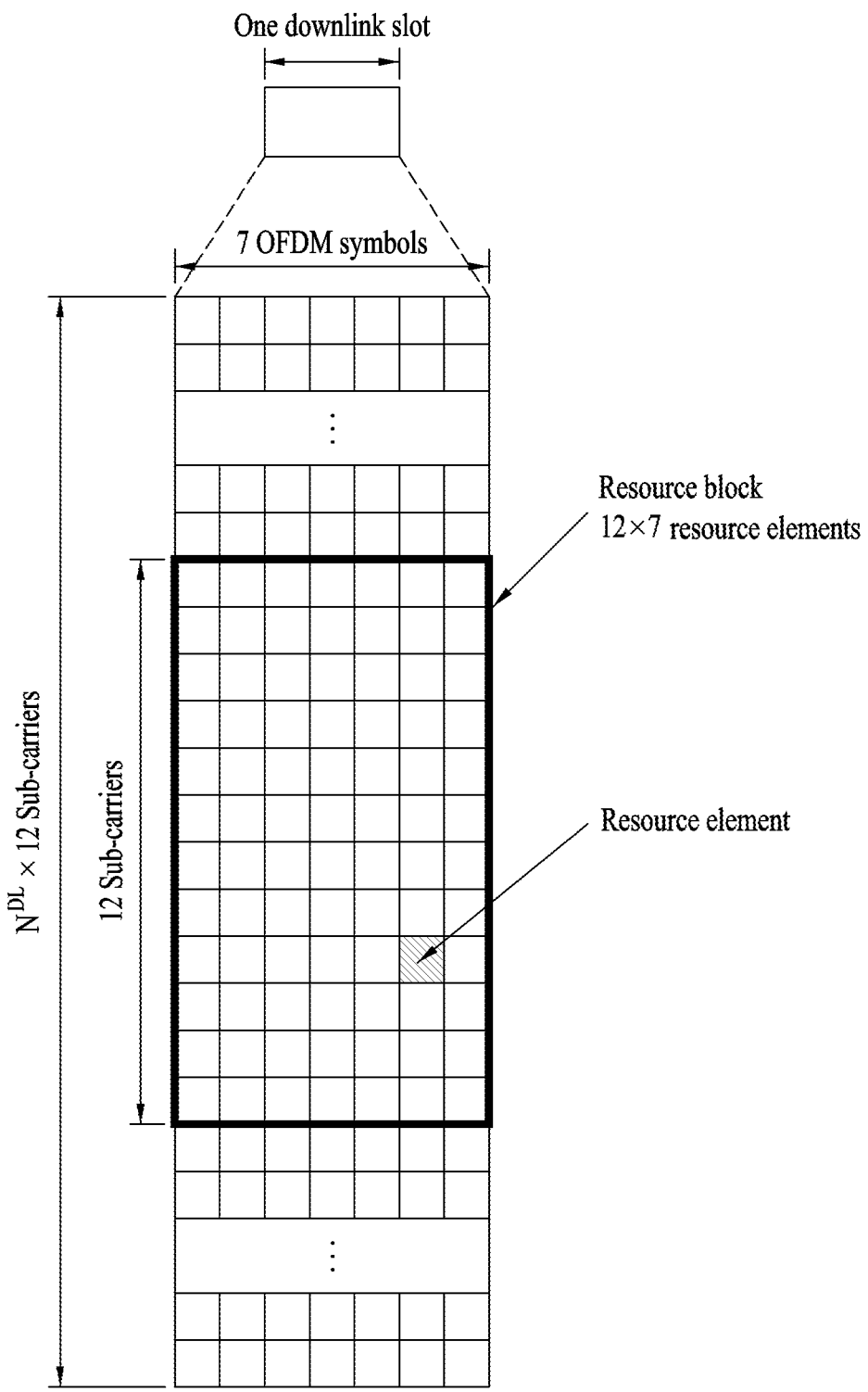
FIG. 2 is a diagram illustrating a resource grid at a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
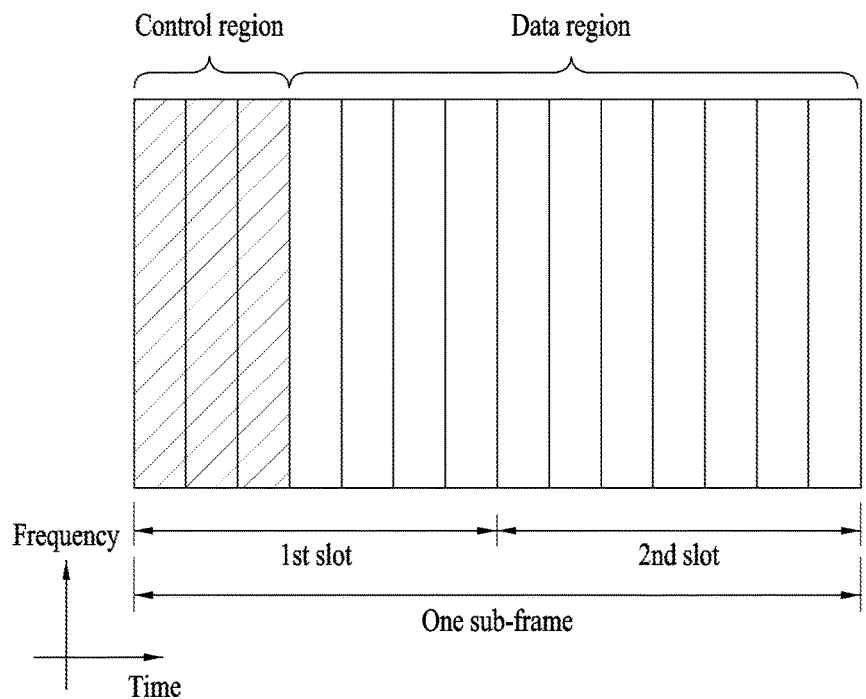
FIG. 3 is a diagram illustrating a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
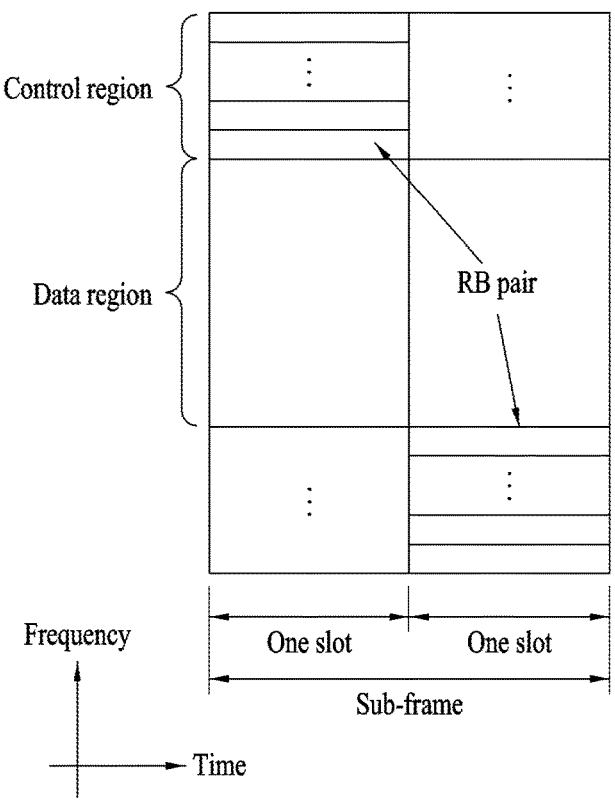
FIG. 4 is a diagram illustrating a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PHICH (Physical Hybrid-ARQ Indicator Channel)

Figure 5:
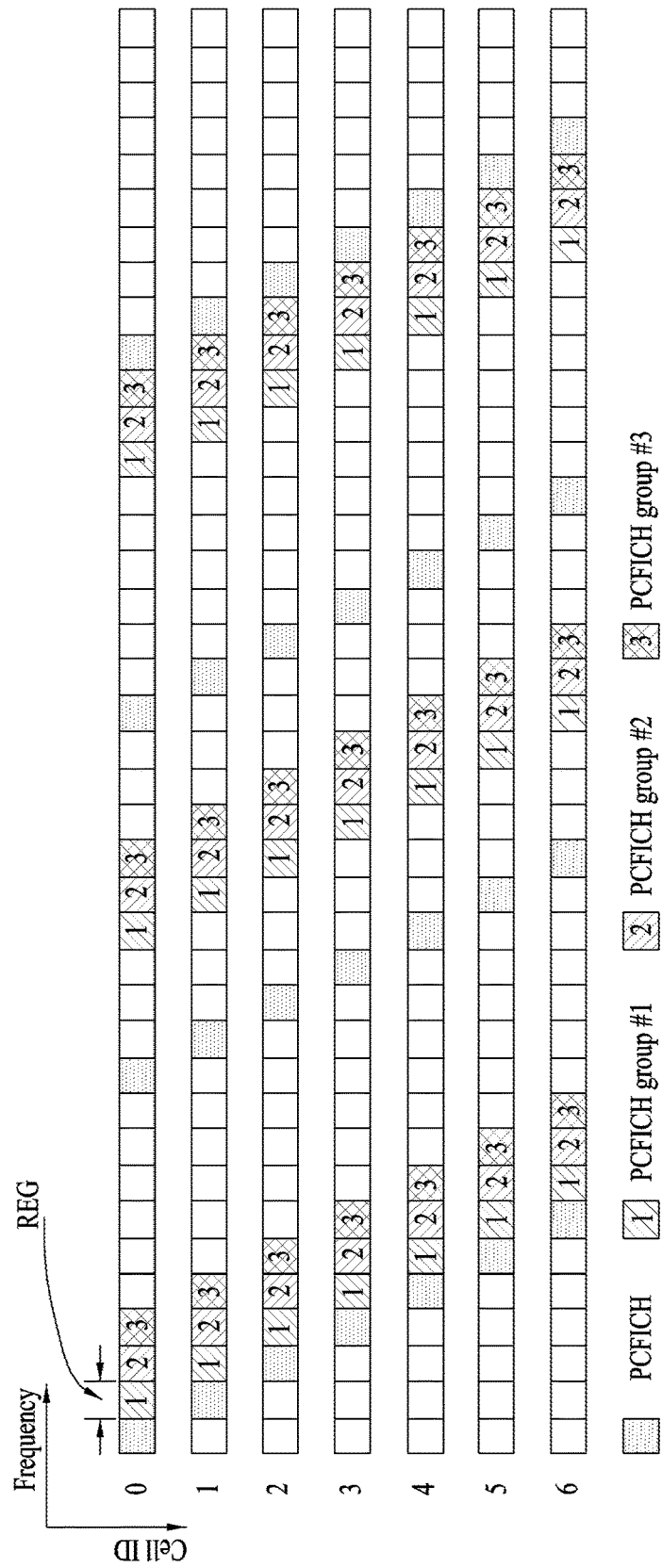
FIG. 5 is a diagram illustrating a PHICH.

FIG. 5 is a diagram illustrating positions of a PCFICH and a physical HARQ indicator channel (PHICH) generally applied to a specific bandwidth. ACK/NACK information for uplink data transmission is transmitted through a PHICH. A plurality of PHICH groups are configured at a single subframe, and a plurality of PHICHs exist in a single PHICH group. Therefore, PHICHs for a plurality of user equipments are included in a single PHICH group.

As shown in FIG. 5, PHICH allocation to each user equipment in a plurality of PHICH groups is performed using a lowest physical resource block (PRB) index of PUSCH resource allocation and a cyclic shift index for a demodulation reference signal (DMRS) transmitted through an uplink grant PDCCH. The DMRS is an uplink reference signal, and is provided along with uplink transmission so as to perform channel estimation for demodulation of uplink data. In addition, a PHICH resource is signaled through an index pair such as ($n_{PHICH}^{group}$, $n_{PHICH}^{seq}$). At this time, in the index pair ($n_{PHICH}^{group}$, $n_{PHICH}^{seq}$), $n_{PHICH}^{group}$ means a PHICH group number and $n_{PHICH}^{seq}$ means an orthogonal sequence index in the corresponding PHICH group. $n_{PHICH}^{group}$ and $n_{PHICH}^{seq}$ are defined as expressed by the following Equation 1.

$$n_{PHICH}^{group} = (I_{PRB\_RA}^{lowest\_index} + n_{DMRS}) \bmod N_{PHICH}^{group} + I_{PHICH} N_{PHICH}^{group}$$
$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In the above Equation 1, $n_{DMRS}$ is a cyclic shift of a DMRS used for uplink transmission related to a PHICH, and is mapped to a value of a 'cycle shift for DMRS' field of the latest uplink grant control information (for example, DCI format 0 or 4) for a transport block (TB) associated with the corresponding PUSCH transmission. For example, the 'cyclic shift for DMRS' field of the latest uplink grant DCI format may have a size of 3 bits. If the 'cyclic shift for DMRS' field is set to "000", $n_{DMRS}$ may be set to zero '0'.

In the above Equation 1, $N_{SF}^{PHICH}$ is the size of a spreading factor used for PHICH modulation. $I_{PRB\_RA}^{lowest\_index}$ is the lowest PRB index of a first slot of the corresponding PUSCH transmission. $I_{PHICH}$ is set to a value of 1 only in a specific case (if UL/DL configuration is set to zero '0' and PUSCH transmission is performed at subframe n=4 or n=9) in a TDD system, and is set to zero '0' in the remaining cases other than the special case. $N_{PHICH}^{group}$ denotes the number of PHICH groups configured by a higher layer, and is defined as expressed by the following Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In the above Equation 2, $N_g$ denotes information on the amount of PHICH resources transmitted to a physical broadcast channel (PBCH), and $N_g$ has a size of 2 bits long and is expressed by $N_g \in \{1/6, 1/2, 1, 2\}$. In the above Equation 2, $N_{RB}^{DL}$ denotes the number of resource blocks (RBs) configured in a downlink.

In addition, examples of orthogonal sequences defined in the legacy 3GPP LTE Release 8/9 are illustrated in the following Table 1.

TABLE 1

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and vi) a positioning reference signal used to estimate geographic position information of the user equipment.

The reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even in case of handover status. The latter reference signal is transmitted from the base station together with a corresponding resource when the base station transmits downlink data. In this case, the user equipment may perform channel measurement by receiving the corresponding reference signal, whereby the user equipment may demodulate the data. This reference signal for data demodulation should be transmitted to a region to which data are transmitted.

The CRS is used for both acquisition of channel information and data demodulation. The user equipment-specific reference signal is used for data demodulation only. The CRS is transmitted per subframe through a wideband. The reference signal for maximum four antenna ports is transmitted depending on the number of transmitting antennas of the base station.

For example, if the number of transmitting antennas of the base station is two, the CRS for the antenna ports 0 and 1 are transmitted. If the number of transmitting antennas is four, the CRS for the antenna ports 0 to 3 are respectively transmitted.

FIG. 6 is a diagram illustrating that CRS and DRS defined in the legacy 3GPP LTE system (for example, release-8) are mapped onto a pair of downlink resource blocks (RBs). A pair of downlink resource blocks (RBs) may be expressed by one subframe on a time domain x twelve subcarriers on a frequency domain as a mapping unit of the reference signal. In other words, a pair of resource blocks on a time axis have a length of 14 OFDM symbols in case of normal cyclic prefix (CP) (FIG. 6(a)) and has a length of 12 OFDM symbols in case of extended cyclic prefix (CP) (FIG. 6(b)).

FIG. 6 illustrates a position of a reference signal on a pair of resource blocks in a system that a base station supports four transmitting antennas. In FIG. 6, resource elements (REs) marked with '0', '1', '2' and '3' represent position of the CRS for each of antenna ports '0', '1', '2' and '3'. Meanwhile, resource elements marked with 'D' represent the position of the DMRS.

DeModulation Reference Signal (DMRS)

The DMRS is the reference signal defined for channel estimation for the PDCSCH through the user equipment. The DMRS may be used in transmission modes 7, 8 and 9. Although the DMRS had been initially defined for single layer transmission of an antenna port 5, the DMRS has been enlarged for spatial multiplexing of maximum eight layers. The DMRS is transmitted for a specific user equipment only as will be aware of it from the user equipment specific reference signal which is another name of the DMRS. Accordingly, the DMRS may be transmitted from the RB only to which the PDSCH for the specific user equipment is transmitted.

Generation of the DMRS for maximum eight layers will be described as follows. The DMRS may be transmitted in such a manner that a reference signal sequence r(m) generated in accordance with the following Equation 3 is mapped into complex-valued modulation symbols $a_{k,l}^{(p)}$ in accordance with the following Equation 4. FIG. 7 illustrates that the DMRS is mapped into a resource grid on a subframe in accordance with the Equation 3 in case of a normal CP, and relates to antenna ports 7 to 10.

$$r(m) = \frac{1}{\sqrt{2}}(1 - 2 \cdot c(2m)) + j\frac{1}{\sqrt{2}}(1 - 2 \cdot c(2m+1)),$$ [Equation 3]

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

In this case, r(m) means a reference sequence, c(i) means a pseudo-random sequence, and $N_{RB}^{max,DL}$ means the number of maximum RBs of a downlink bandwidth.

[Equation 4]

$$a_{k,l}^{(p)} = w_p(l') \cdot r(3 \cdot l' \cdot N_{RB}^{max,DL} + 3 \cdot n_{PRB} + m')$$

$$w_p(i) = \begin{cases} \overline{w}_p(i) & (m' + n_{PRB})\text{mod } 2 = 0 \\ \overline{w}_p(3 - i) & (m' + n_{PRB})\text{mod } 2 = 1 \end{cases}$$

$$k = 5m' + N_{sc}^{RB}n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\text{mod } 2 + 2 & \text{in case of special subframe} \\ & \text{configurations } 3, 4, 8, 9 \\ l'\text{mod } 2 + 2 + 3\lfloor l'/2 \rfloor & \text{in case of special subframe} \\ & \text{configurations } 1, 2, 6, 7 \\ l'\text{mod } 2 + 5 & \text{in case of no special subframe} \end{cases}$$

$$l' = \begin{cases} 0, 1, 2, 3 & n_s\text{mod } 2 = 0, \text{ and in case of special subframe} \\ & \text{configurations } 1, 2, 6, 7 \\ 0, 1 & n_s\text{mod } 2 = 0, \text{ and in case of no special} \\ & \text{subframe configurations } 1, 2, 6, 7 \\ 2, 3 & n_s\text{mod } 2 = 1, \text{ and in case of no special} \\ & \text{subframes } 1, 2, 6, 7 \end{cases}$$

As will be aware of it from the above Equation 4, an orthogonal sequence $\overline{w}_p(i)$ as illustrated in Table 2 below is used as the reference signal sequence in accordance with an antenna port when the reference signal sequence is mapped into a complex modulated symbol.

TABLE 2

| Antenna port $p$ | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Enhanced EPDCCH (EPDCCH)

In the LTE system following Release 11, an enhanced-PDCCH (EPDCCH) has been considered as a solution for capacity lack of a PDCCH due to coordinated multi point (CoMP) or multi user-multiple input multiple output (MU-MIMO) or PDCCH performance reduction due to inter-cell interference. In the EPDCCH, in order to obtain precoding gain, etc., channel estimation may be performed based on a DMRS, unlike a legacy CRS-based PDCCH.

EPDCCH transmission may be divided into localized EPDCCH transmission and distributed EPDCCH transmission depending on the configuration of physical resource block (PRB) pairs used for EPDCCH transmission. The localized EPDCCH transmission means that ECCEs used for one DCI transmission are adjacent in the frequency domain and specific precoding is applicable in order to obtain beamforming gain. For example, localized EPDCCH transmission may be based on consecutive ECCEs corresponding to an aggregation level. In contrast, the distributed EPDCCH transmission means that one EPDCCH is transmitted from separated PRB pairs in the frequency domain, and has frequency diversity gain. For example, the distributed EPDCCH transmission may be based on an ECCE comprised of four EREGs which are respectively included in the separated PRB pairs in the frequency domain. One or two EPDCCH PRB sets may be configured for the user equipment through higher signaling, and each EPDCCH PRB set may be intended for any one of the localized EPDCCH transmission and the distributed EPDCCH transmission. If two EPDCCH PRB sets exist, all or some of the two sets may be overlapped.

The base station may transmit control information by mapping the control information into REs of EREG allocated for the EPDCCH from one or more EPDCCH PRB sets. In this case, the EREGs are used to define mapping of a control channel in RE, and 16 EREGs (EREG numbers 0 to 15) may exist for one PRB pair. Four EREGs (or eight EREGs as the case may be) may constitute one ECCE, and x number of ECCEs (x is any one of 1, 2, 4, 8, 16 and 32) may constitute one EPDCCH. In case of the distributed EPDCCH transmission, EREGs existing in several PRB pairs may constitute one ECCE for diversity. In more detail, in case of the distributed EPDCCH transmission, EREG to ECCE mapping (hereinafter, first ECCE number-EREG number-PRB number relation) may mean that ECCE index in the EPDCCH PRB set corresponds to EREG index $\lfloor n/N_{RB}^{X_m} \rfloor + jN_{ECCE}^{RB}$ in the PRB pair index $(n+j\max(1, N_{RB}^{X_m}/N_{EREG}^{ECCE})) \bmod N_{RB}^{X_m}$. In this case, n means an ECCE number, $N_{RB}^{X_m}$ means the number of PRB pairs included in the EPDCCH set Xm, $N_{EREG}^{ECCE}$ means the number of EREGs per ECCE, $N_{ECCE}^{RB}$ means the number of ECCEs per PRB pair, and $j=0, 1, \ldots, N_{EREG}^{ECCE}-1$. For example, if four PRB pairs are included in the EPDCCH PRB set, according to the aforementioned first ECCE number-EREG number-PRB number relation, ECCE index 0 is comprised of EREG 0 of PRB pair 0, EREG 4 of PRB pair 1, EREG 8 of PRB pair 2, and EREG 12 of PRB pair 4. This EREG to ECCE mapping relation is shown in FIG. 8.

The user equipment may perform blind decoding similarly to the legacy LTE/LTE-A system to receive/acquire control information (DCI) through the EPDCCH. In more detail, the user equipment may attempt (monitor) decoding with respect to a set of EPDCCH candidates per aggregation level, for DCI formats corresponding to a set transmission mode. The set of EPDCCH candidates to be monitored may be referred to as an EPDCCH UE-specific search space and this search space may be set/configured per aggregation level. In addition, the aggregation level may be {1, 2, 4, 8, 16, 32} depending on subframe type, CP length and the amount of available resources in a PRB pair, slightly differently from the aforementioned legacy LTE/LTE-A system.

In case of the user equipment in which an EPDCCH is configured, REs included in PRB pairs are indexed with EREGs, and these EREGs may be indexed with ECCE units. EPDCCH candidates constituting the search space may be determined based on the indexed ECCEs and blind decoding may be performed, whereby control information may be received.

The user equipment that has received the EPDCCH may transmit ACK/NACK for the EPDCCH onto the PUCCH. At this time, resources which are used, that is, index of the PUCCH resources may be determined by the lowest ECCE index of ECCEs used for EPDCCH transmission. That is, the index of the PUCCH resources may be expressed by the following Equation 5.

$$n_{PUCCH-ECCE}^{(1)} = n_{ECCE} + N_{PUCCH}^{(1)} \qquad \text{[Equation 5]}$$

In the Equation 2, $n_{PUCCH-ECCE}^{(1)}$ means the PUCCH resource index, $n_{ECCE}$ means the lowest ECCE index of ECCEs used for EPDCCH transmission, and $N_{PUCCH}^{(1)}$ (which may be referred to as $N_{PUCCH,EPDCCH}^{(1)}$) is a value transferred through higher signaling and means a point where the PUCCH resource index is started.

However, if the PUCCH resource index is determined uniformly by the aforementioned Equation 5, a problem of resource contention may occur. For example, if two EPDCCH PRB sets are configured, since ECCE indexing in each EPDCCH PRB set is independent, the lowest ECCE index in each EPDCCH PRB set may exist equally. In this case, a start point of the PUCCH resource may be varied depending on a user to solve the problem. However, if the start point of the PUCCH resource is varied depending on a user, many PUCCH resources are reserved to lead to be inefficient. Also, since DCI of several users may be transmitted at the same ECCE location in the EPDCCH like MU-MIMO, a method for allocating PUCCH resources by considering such transmission will be required. In order to solve this problem, ARO (HARQ-ACK Resource Offset) has been introduced. The ARO shifts the lowest ECCE index of ECCE indexes constituting the EPDCCH, PUCCH resource determined by start offset of the PUCCH resources transferred through higher layer signaling, to a predetermined level, so as to avoid contention of the PUCCH resources. The ARO is indicated as illustrated in Table 3 below through 2 bits of DCI formats 1A/1B/1D/1/2A/2/2B/2C/2D transmitted through the EPDCCH.

TABLE 3

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

The base station may designate any one of ARO values in Table 3, for a specific user equipment, and then may notify the specific user equipment of ARO, which will be used when the PUCCH resource is determined, through the DCI format. The user equipment may detect an ARO field from its DCI format, and may transmit ACK/NACK through the PUCCH resource determined by using the detected value.

In addition to the introduction of the EPDCCH, introduction of an EPHICH has been considered. In particular, in a new carrier type (this carrier may also be used for carrier aggregation, etc.) from which the legacy control channel or reference signal is excluded, introduction of an EPHICH more advanced than the legacy PHICH may be more preferred. Therefore, a resource location, structure, antenna mapping, etc. of an EPHICH according to the embodiment of the present invention will be described hereinafter. In the following description, EPHICH resources may be comprised of specific OFDM symbols or remaining available REs except predetermined signals (for example, RS, etc.) from the specific OFDM symbols. In the following description, an EPHICH resource region may be referred to as a first region. Also, a minimum unit for transmitting the EPHICH may be an EPHICH group, which may be allocated to one PRB pair as described later or may be allocated to a plurality of PRB pairs.

In particular, the EPHICH according to the embodiment of the present invention may be configured in a (distributed) EPDCCH region. A first region may be determined with respect to imbalance of antenna ports (APs) allocated to the REs (first embodiment) in view of the EPDCCH, or may be determined considering balance of antenna ports of the EPHICH.

Embodiment 1

The first embodiment relates to determination of a first region by considering both imbalance of EPDCCH antenna ports and balance of EPHICH antenna ports.

First of all, imbalance of antenna ports will be described with reference to FIG. 9. FIG. 9 illustrates that antenna ports are allocated to REs of a PRB pair to which a distributed EPDCCH is transmitted. As shown, the number of REs to which a port 7 (antenna port 107, that is, first antenna port) is different from the number of REs to which a port 9 (antenna port 109, that is, second antenna port), whereby imbalance is generated in view of EPDCCH antenna ports. Such antenna port imbalance may be solved by appropriately configuring the first region. That is, the first region may be configured to solve imbalance of the EPDCCH antenna ports. For example, the first region may be configured in such a manner that a difference (value) between the number of REs to which a first antenna port is allocated and the number of REs to which a second antenna port is allocated reaches a predetermined value (for example, integer such as 0 and 1) or less. In this case, the REs to which the first antenna port is allocated and the REs to which the second antenna port is allocated may exclude REs included in the first region among available REs for the EPDCCH on a PRB pair. Also, the available REs for the EPDCCH may exclude REs for predetermined signals (DMRS, PSS/SSS, etc.). Referring to the example shown in FIG. 10, the first region (EPHICH region) may be determined in such a manner that a difference between the number of REs to which the first antenna port (port 7) is mapped and the number of REs to which the second antenna port (port 9) is mapped, among REs except REs (REs for DM-RS) for the DMRS in the PRB pair, reaches 0. In this case, referring to the other EPDCCH region except the DMRS and the first region, it is noted that the number of REs to which the first antenna port is mapped is 60 and likewise the number of REs to which the second antenna port is mapped is 60. That is, the first region may be located on OFDM symbols #5, #6, #12 and #13, whereby balance of antenna ports allocated to EPDCCH REs may be obtained.

Figure 10:
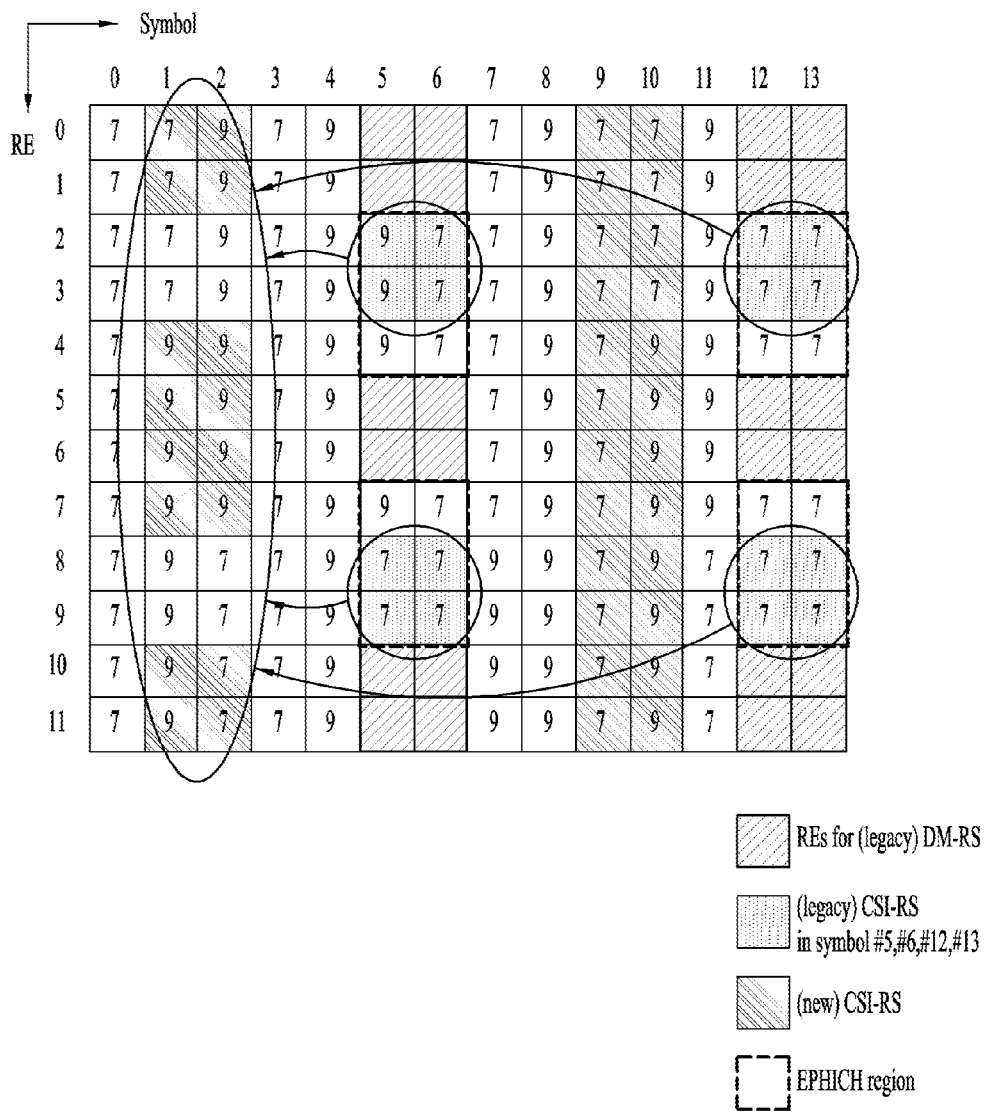

If the CSI-RS is transmitted on the PRB pair, collision with the first region is generated. To solve such collision, the resource region for the CSI-RS may be modified as shown in FIG. 10 (extremely, the CSI-RS may be not be transmitted on the PRB pair to which the EPHICH is transmitted). The difference value between the number of REs to which the first antenna port is allocated and the number of REs to which the second antenna port is allocated in the resource region for the CSI-RS may be set to less than or equals to a predetermined value. That is, the region for the CSI-RS may be selected considering antenna balancing of the EPDCCH REs.

Antenna mapping in the EPHICH region may be performed again in the first region determined as described above, separately from the antenna ports related to the EPDCCH. In this case, antenna ports may be allocated to the REs included in the first region depending on how many PRB pairs, in which the EPHICH group is distributed, exist. In more detail, if one EPHICH group comprised of k number of REs (e.g., k=12) is allocated to n number of PRB pairs, the first antenna port and the second antenna port may uniformly be allocated to k/n number of REs corresponding to the EPHICH group among the REs included in the first region. This will be described in detail with reference to FIGS. 11 to 16.

Figure 11:
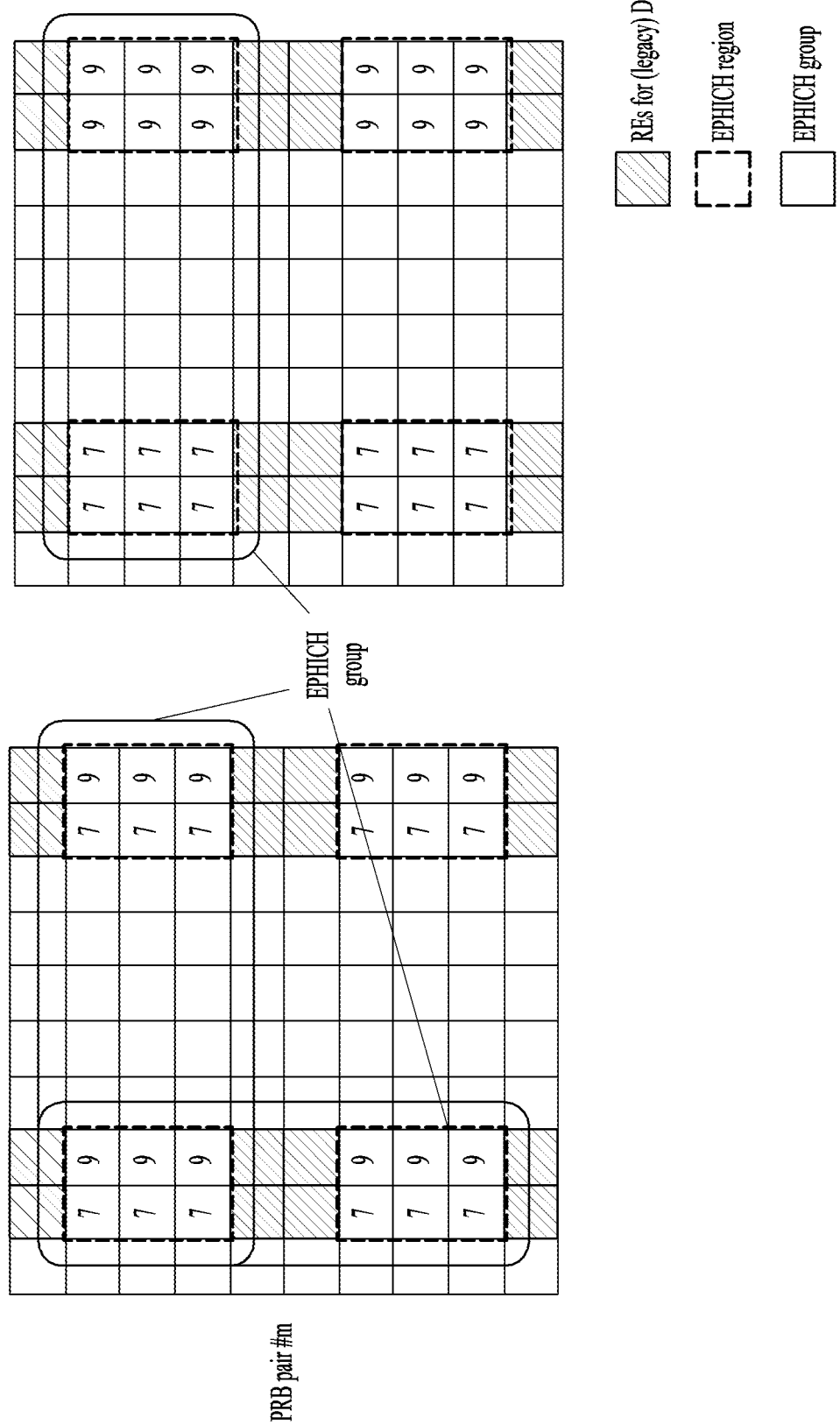

Referring to FIG. 11, one EPHICH group (12 REs) is distributed in one PRB pair, whereby AP balancing is performed within each EPHICH group only. That is, antenna ports 107 and 109 may uniformly be allocated to 12 REs in the EPHICH group.

Figure 12:
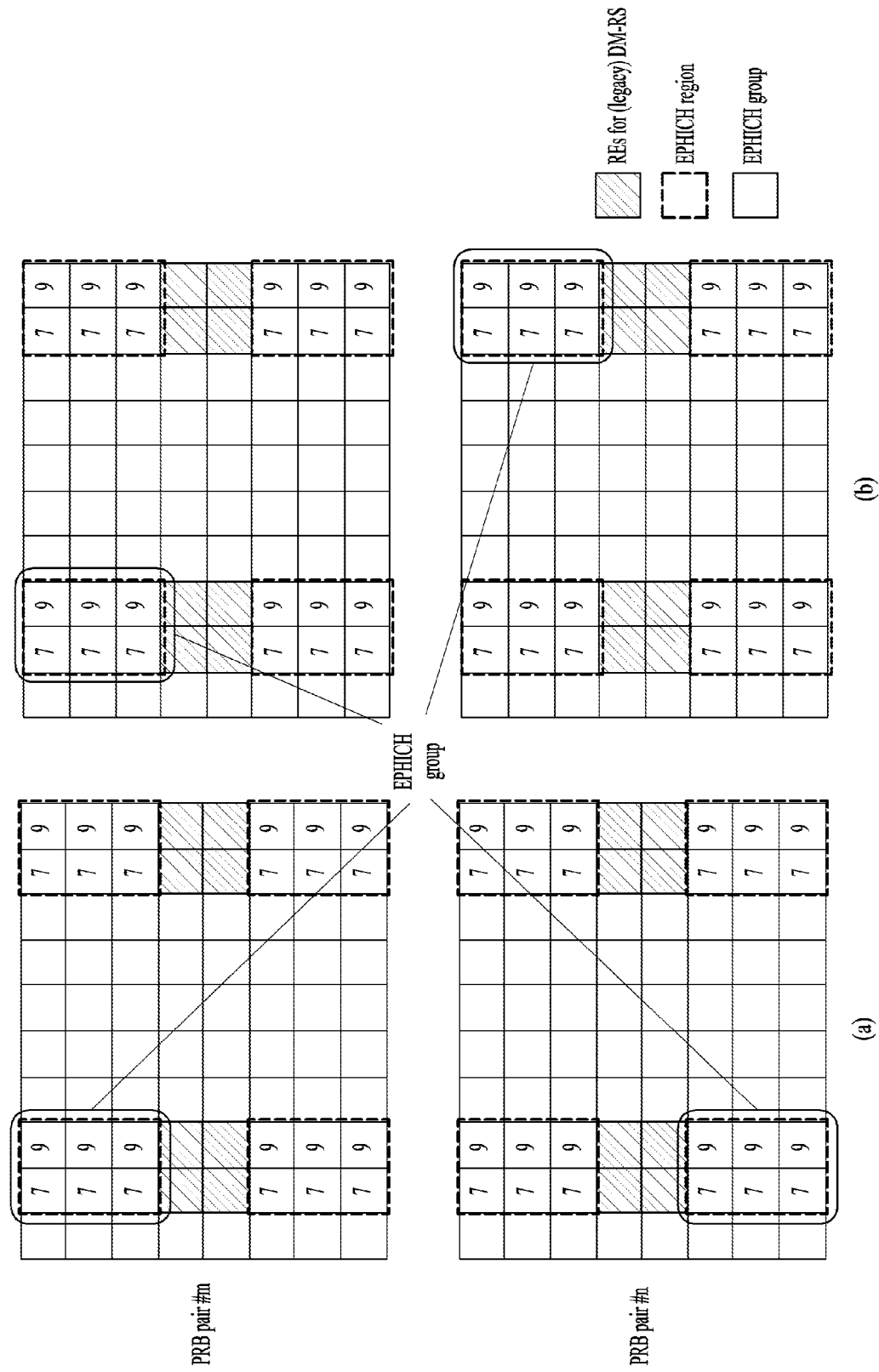

Referring to FIG. 12, one EPHICH group (12 REs) is distributed in two PRB pairs, whereby AP balancing is performed within each EPHICH partition (6 REs) only. The EPHICH partitions constituting the EPHICH group may be selected in various manners as shown in FIGS. 12(a) and 12(b), wherein antenna ports may uniformly be allocated within each partition.

Figure 13:
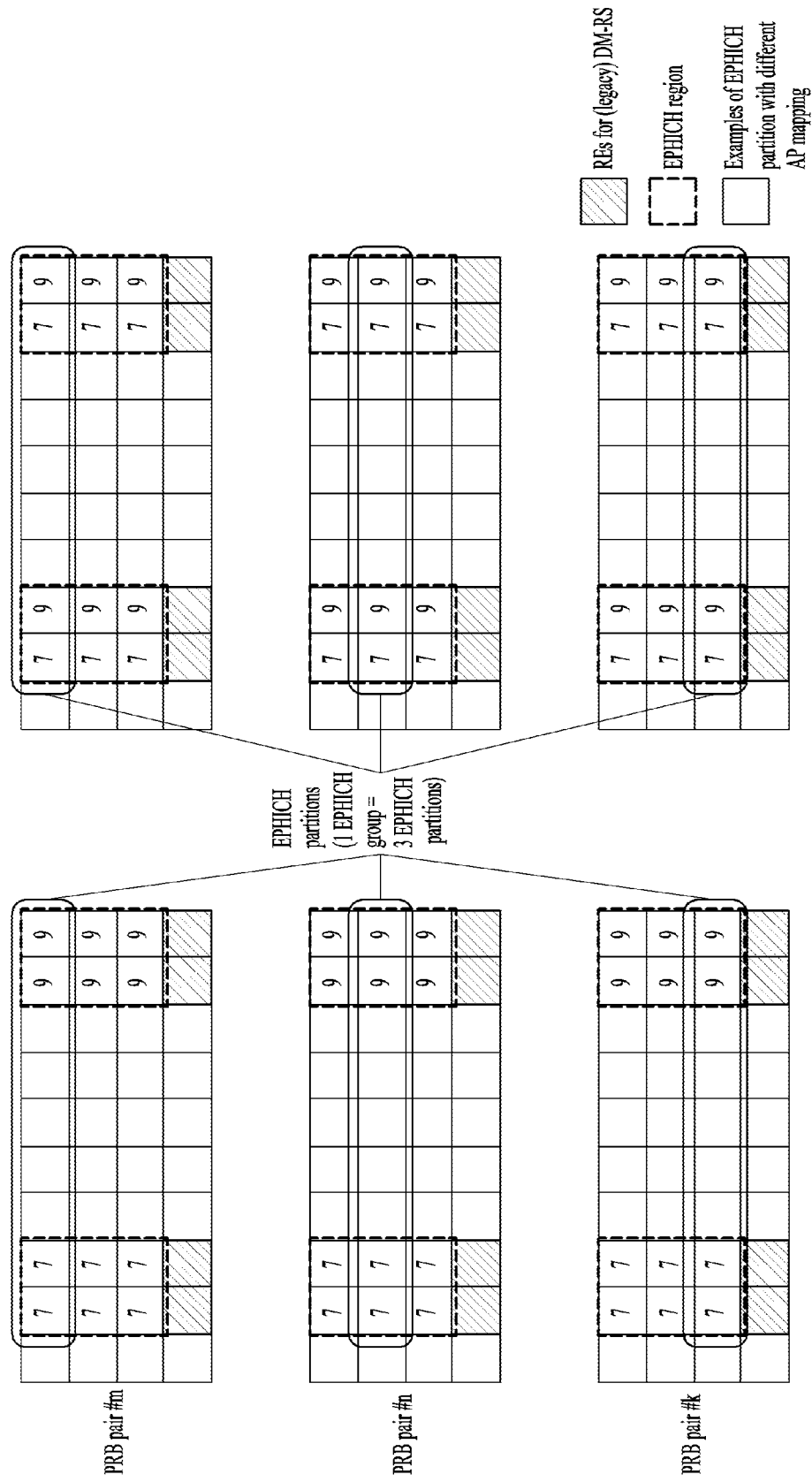

Referring to FIG. 13, one EPHICH group (12 REs) is distributed in three PRB pairs, whereby AP balancing is performed within each EPHICH partition (4 REs) only. Referring to FIG. 14, one EPHICH group (12 REs) is distributed in three PRB pairs, and symbols subjected to spreading from one ACK/NACK (A/N) symbol are mapped into REs corresponding to each EPHICH group. In this case, each EPHICH group is subjected to CDM by a spreading factor 4, and it is preferable in view of demodulation (or dispreading) performance that REs into which symbols are mapped are adjacent to one another if possible. Therefore, as illustrated in FIG. 14(b), the REs included in each EPHICH partition may be continuous on any one domain of a time domain and a frequency domain. In contrast, if the EPHICH partition is not comprised of REs subjected to spreading from one A/N symbol, it is not required that the EPHICH REs should be adjacent to one another. That is, as illustrated in FIG. 15, the REs included in the EPHICH partition may be spaced apart from one another as much as one or more subcarriers.

Figure 16:
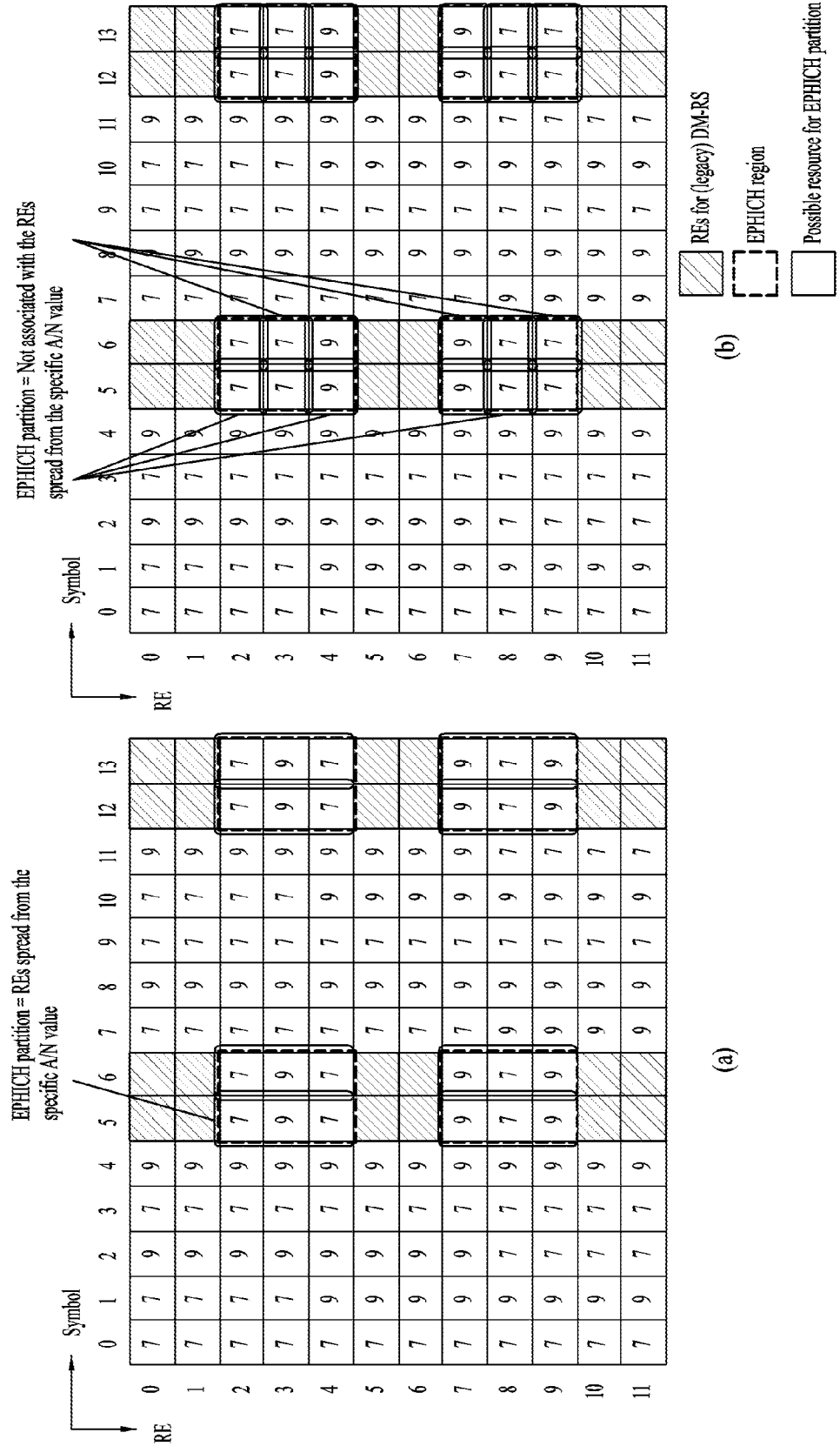

Referring to FIG. 16, EPHICH partitioning is performed in such a manner that one EPHICH group (12 REs) is distributed in four PRB pairs. In this case, two REs to which the first antenna port is allocated and one RE to which the second antenna port is allocated may be included in each EPHICH partition. Similarly, one RE to which the first antenna port is allocated and two REs to which the second antenna port is allocated may be included in each EPHICH partition. FIG. 16(a) illustrates that the EPHICH partition is comprised of REs subjected to spreading from one A/N symbol, and FIG. 16(b) illustrates that the EPHICH partition is not comprised of REs subjected to spreading from one A/N symbol.

Embodiment 2

The second embodiment relates to a method for performing antenna port balancing in a first region without performing antenna port allocation in an EPHICH region by appropriately selecting the first region from an EPDCCH region. In this embodiment, a portion of the EPDCCH region where AP balancing is made well may be used as the EPHICH region.

Embodiment 2-1

Figure 17:
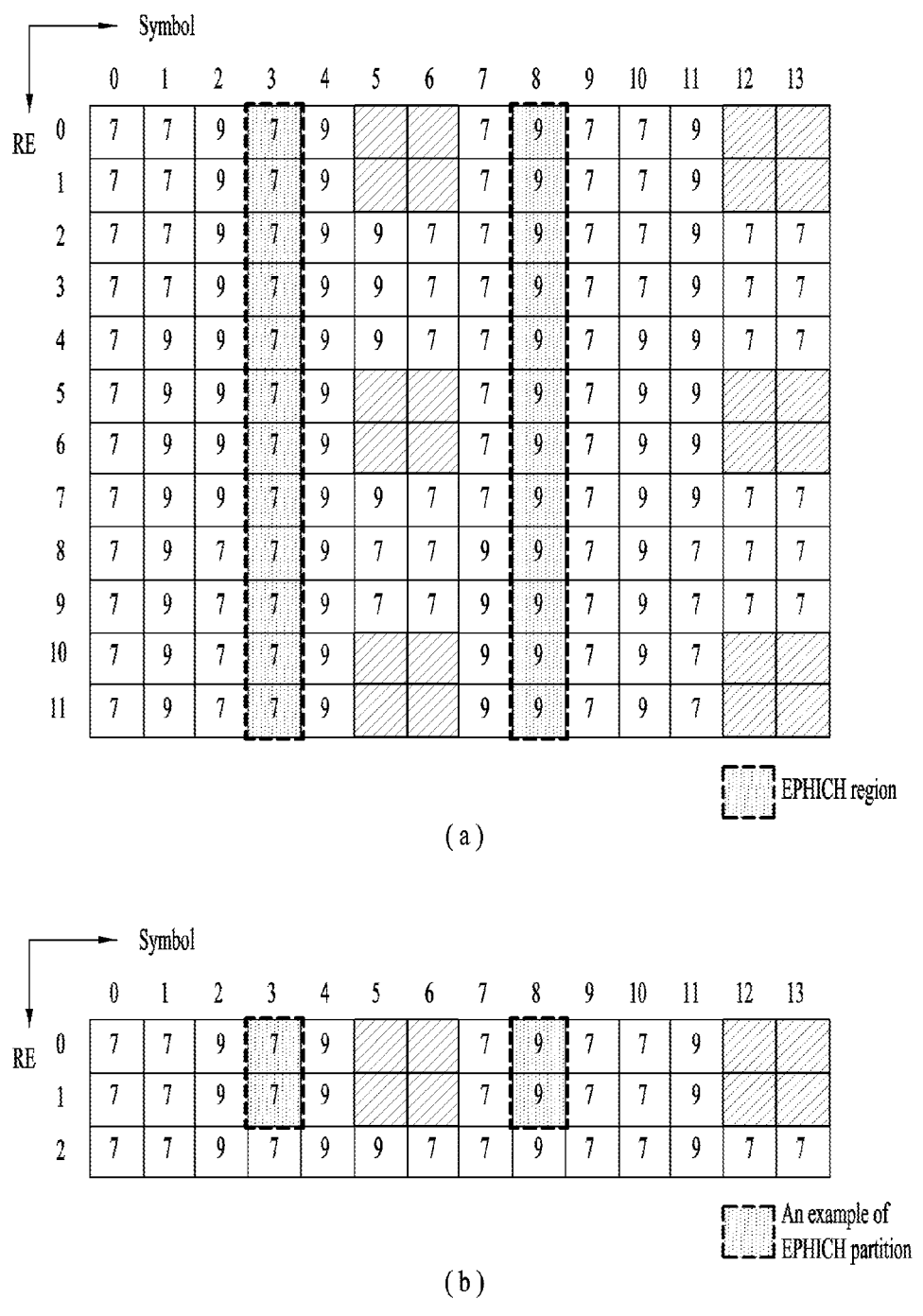

In FIG. 17, OFDM symbols #3 and #8 are used as an example of the second embodiment. Antenna ports 107 and 109 are uniformly allocated to the OFDM symbols #3 and #8 as shown in FIG. 17. Therefore, the OFDM symbols #3 and #8 may be selected as the first region, whereby antenna port balancing may be achieved even without separate antenna port allocation for EPHICH. In this way, if the first region is selected, a partitioning method may be varied depending on how many RBs to which one EPHICH group is allocated exist in the same manner as the aforementioned Embodiment 1. If one EPHICH group comprised of k number of REs (e.g., 12 REs) is allocated to n number of PRB pairs, the number m of REs allocated per PRB pair is maximum ceil (k/n). At this time, ceil (m/2) number of REs and floor (m/2) number of REs may be allocated to each symbol. For example, if one EPHICH group is allocated to three PRB pairs as shown in FIG. 17(b), it is noted that four REs are allocated to each PRB pair, two REs are allocated to the AP 107 in the OFDM symbol #3 and two REs are allocated to the AP 109 in the symbol #8. In this case, two REs combined on each symbol may be combined in various manners depending on configuration or PRB pair index.

Embodiment 2-2

Figure 18:
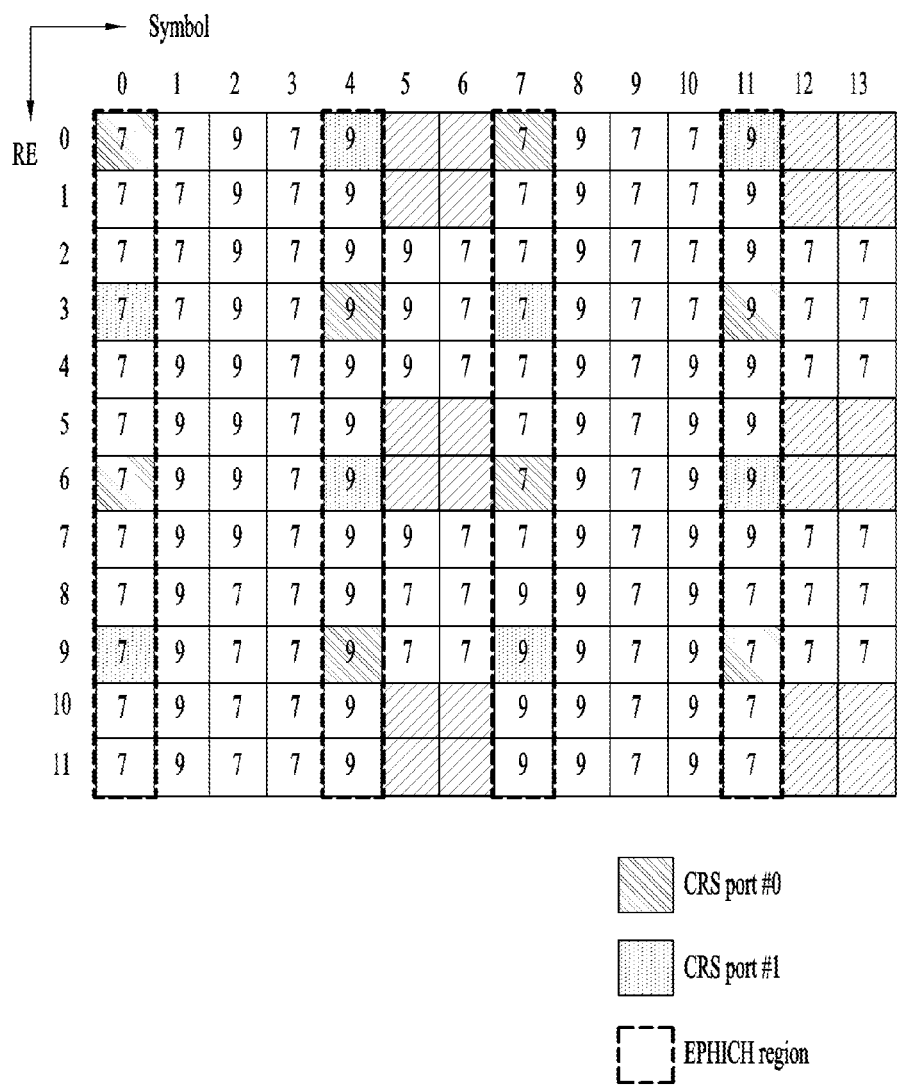

OFDM symbols #0, #4, #7, and #11 (except CRS port #0 and/or CRS port #1) may be selected for the first region. In case of the Embodiment 2-2, OFDM symbols to which the CRS is transmitted as the first region, but REs to which CRS/TRS is transmitted are excluded. Referring to FIG. 18, except for REs to which the CRS/TRS port #0 is transmitted, it is noted that a total of 40 REs may be used for EPHICH transmission, the number of REs to which the antenna port 107 is allocated is 19 and the number of REs to which the antenna port 109 is allocated is 21. If a v-shift value is applied to the CRS/TRS port #0, the number of REs to which the antenna ports 107 and 109 are allocated is varied but the number of REs to which the antenna port 107 is allocated may be the same as the number of REs to which the antenna port 109 is allocated. Even if there is a difference between the number of REs to which the antenna port 107 is allocated and the number of REs to which the antenna port 109 is allocated, the difference is maximum 2. This is illustrated in Table 4 below.

TABLE 4

| | v-shift for CRS Port #0 | | | | |
|---|---|---|---|---|---|
| | 0 | 1 | 2 | 3 | 4 |
| REs for AP 107 | 19 | 19 | 20 | 21 | 21 |
| REs for AP 109 | 21 | 21 | 20 | 19 | 19 |

If the CRS ports #0 and #1 are grouped, the number of REs per antenna port is illustrated in the following Table 5.

TABLE 5

| | v-shift for CRS Port #0, #1 | | | | |
|---|---|---|---|---|---|
| | 0 | 1 | 2 | 3 | 4 |
| REs for AP 107 | 16 | 16 | 16 | 16 | 16 |
| REs for AP 109 | 16 | 16 | 16 | 16 | 16 |

However, if the EPHICH group comprised of 12 REs is used in any case of the above Tables 4 and 5, idle REs may be generated. To this end, i) only 40 REs (or 32 REs) of symbols #0, #4, #7, and #11 may be used for EPHICH, wherein the number of REs of the EPHICH group may be changed to 10, 20, or the like, or even though idle REs are generated, the EPHICH group of 12 REs may be used or a plurality of RBs (for example, 120 REs are used for three RBs) may be used. Alternatively, ii) in addition to the symbols #0, #4, #7, and #11, additional resources may be used. For example, REs of OFDM symbol #1 may be used additionally.

Figure 19:
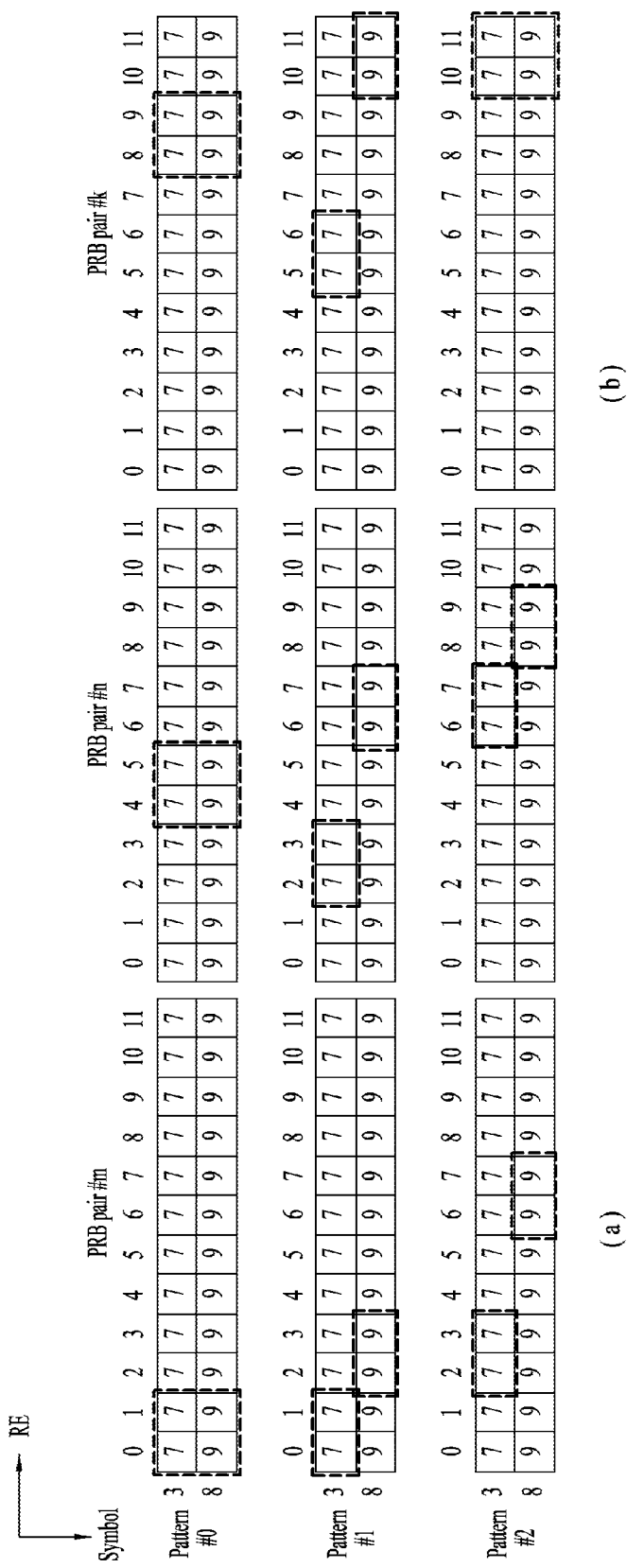

In the aforementioned description, the methods of the Embodiment 1 and the Embodiment 2-2 are advantageous in that frequency diversity may be acquired as one EPHICH group is allocated to a plurality of RBs. Also, in actual application, the aforementioned various methods may be used in a combined type. For example, in order to minimize resource collision between neighboring transmission points or average interferences between the EPHICH resources, partitioning patterns different from one another per transmission point may be used. In more detail, if the number of cases that EPHICH partitioning pattern may be generated is p, the partitioning pattern may be determined transmission point ID (one of physical ID and virtual ID, that is, TP_ID)-specifically (partitioning pattern #=TP_ID mod p). In this case, various EPHICH partitioning patterns may exist as illustrated in FIG. 19, and are not limited to the partitioning patterns of FIG. 19.

Embodiment 3

In the third embodiment, the first region may be selected/determined regardless of antenna port balancing of the EPDCCH. The EPHICH resources described in the Embodiment 1 may be used except that the first region is determined such that the difference value between the number of REs to which the first antenna port is allocated and the number of REs to which the second antenna port is allocated may be set to less than or equals to a predetermined value. That is, restrictions in selection/determination of the first region are reduced.

As a detailed example of this embodiment, when EPHICH partition is configured from REs to which symbols subjected to spreading (Spreading Factor=n) from the same A/N symbol are mapped, the mth partition of the EPHICH partition may include REs of continuous indexes of RE #(m*n), RE #(m*n)+1, RE #(m*n)+2, . . . , RE #{m*n+(n−1)}. When the EPHICH partition is configured from REs to which symbols subjected to spreading (Spreading Factor=n) from the different A/N symbols are mapped, the mth partition of the EPHICH partition may include REs of continuous indexes of RE #m, RE #(m+1*n), RE #(m+2*n), . . . , RE #[m+{(12/n)−1}*n](or, #(m−n+12)).

Configuration of Apparatus According to the Embodiment of the Present Invention

Figure 20:
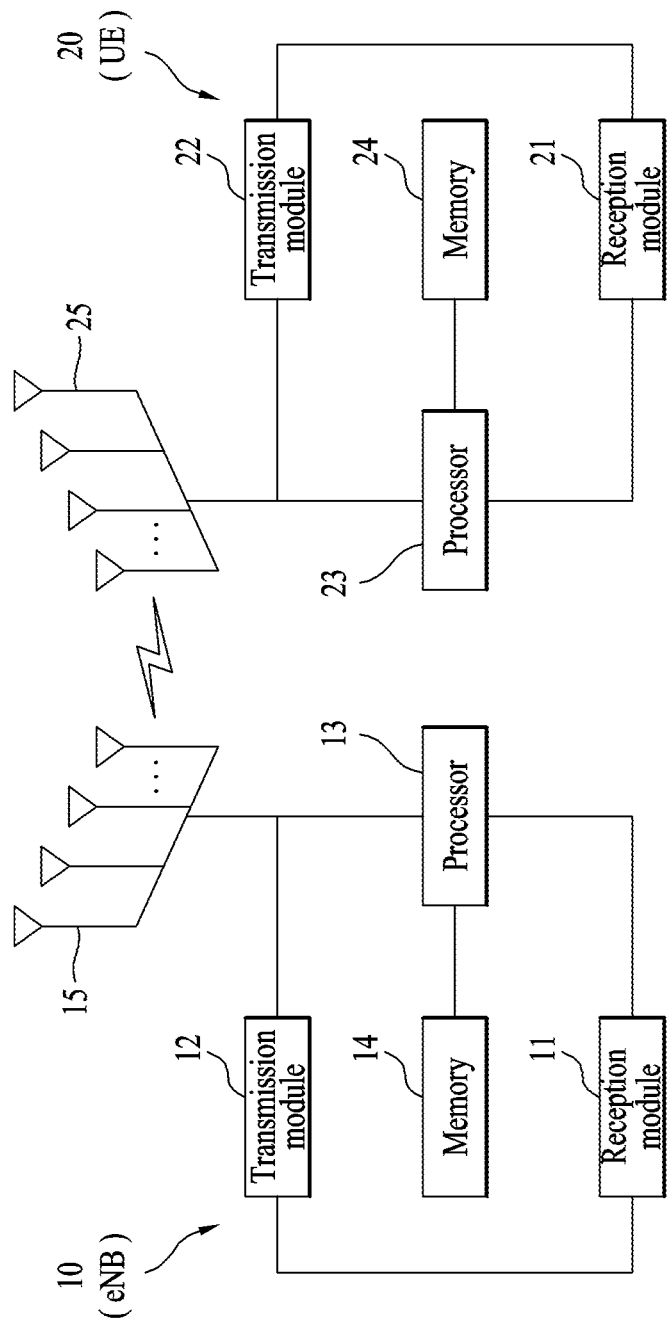
FIG. 20 is a diagram illustrating a configuration of a transceiving apparatus.

FIG. 20 is a diagram illustrating configurations of a transmission point and a user equipment UE according to the embodiment of the present invention.

Referring to FIG. 20, a transmission point 10 according to the present invention may include a reception module 11, a transmission module 12, a processor 13, a memory 14, and a plurality of antennas 15. The plurality of antennas 15 mean the transmission point that supports MIMO transmission and reception. The reception module 11 may receive various signals, data and information on an uplink from the user equipment. The transmission module 12 may transmit various signals, data and information on a downlink to the user equipment. The processor 13 may control an overall operation of the transmission point 10.

The processor 13 of the transmission point 10 according to one embodiment of the present invention may perform operations necessary for the embodiments described above.

The processor 13 of the transmission point 10 may function to computationally process information received by the transmission point 10 or information to be transmitted to the outside, etc. The memory 14, which may be replaced with an element such as a buffer (not shown), may store the computationally processed information for a predetermined time.

Subsequently, referring to FIG. 20, the user equipment 20 according to the present invention may include a reception module 21, a transmission module 22, a processor 23, a memory 24, and a plurality of antennas 25. The plurality of antennas 25 mean the user equipment that supports MIMO transmission and reception. The reception module 21 may receive various signals, data and information from a base station on a downlink. The transmission module 22 may transmit various signals, data and information to the base station on an uplink. The processor 23 may control an overall operation of the user equipment 20.

The processor 23 of the user equipment 20 according to one embodiment of the present invention may perform operations necessary for the embodiments described above.

The processor 23 of the user equipment 20 may function to computationally process information received by the user equipment 20 or information to be transmitted to the outside, and the memory 24, which may be replaced with an element such as a buffer (not shown), may store the computationally processed information for a predetermined time.

The detailed configurations of the transmission point and the user equipment as described above may be implemented such that the above-described embodiments are independently applied or two or more thereof are simultaneously applied, and description of redundant parts will be omitted for clarity.

Also, description of the transmission point 10 in FIG. 20 may also be applied to a relay which serves as a downlink transmitter or an uplink receiver, and description of the user equipment 20 may be equally applied to a relay which serves as a downlink receiver or an uplink transmitter.

The aforementioned embodiments of the present invention may be implemented through various means, for example, hardware, firmware, software, or a combination thereof.

When implemented by hardware, the method according to the embodiments of the present invention may be embodied by one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present invention may be embodied by a module, a procedure, or a function that performs the functions or operations described above. Software code may be stored in a memory unit and executed by a processor. The memory unit is located at the interior or exterior of the processor and may transmit and receive data to and from the processor via various known means.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

What is claimed is:
1. A method of transmitting and receiving a signal by a user equipment in a wireless communication system, the method comprising:
    transmitting uplink data to a base station; and
    receiving, from the base station, an acknowledgement (ACK)/non-acknowledgement (NACK) for the uplink data via an Enhanced Physical Hybrid automatic repeat request Indicator Channel (EPHICH) resource region in an Enhanced Physical Downlink Control Channel (EPDCCH) region,
    wherein the EPHICH resource region is located in 1st, 5th, 8th, and 12th orthogonal frequency division multiplexing (OFDM) symbols,
    wherein the EPHICH resource region includes first resource units (REs) excluding REs for a CRS port index 0 and a CRS port index 1 among REs included in the 1st, 5th, 8th, and 12th OFDM symbols,
    wherein the EPHICH resource region includes second REs allocated to a first antenna port and third REs allocated to a second antenna port,
    wherein the first antenna port and the second antenna port are allocated to available REs for the EPDCCH on a Physical Resource Block (PRB) pair except for the second REs and the third REs included in the first REs, and
    wherein a difference between a number of the second REs and a number of the third REs is less than or equal to a predetermined value, if a Channel State Information-Reference Signal (CSI-RS) is transmitted on the PRB pair.

2. The method according to claim 1,
wherein the EPHICH resource region comprises an EPHICH group,
wherein the EPHICH group comprising fourth REs to which one or more ACK/NACK symbols are mapped and distributed in Physical Resource Block (PRB) pairs, and
wherein antenna ports are allocated to REs included in the EPHICH resource region depending on a number of the PRB pairs in which the EPHICH group is distributed.

3. The method according to claim 2,
wherein the antenna ports include a first antenna port and a second antenna port, and
wherein, if the EPHICH group is distributed in n number of PRB pairs and one EPHICH group is comprised of k number of REs, the first antenna port and the second antenna port are uniformly allocated to k/n number of REs corresponding to the EPHICH group in each PRB pair, where n is an integer.

4. The method according to claim 2, wherein the EPHICH group includes 12 REs.

5. The method according to claim 1, wherein the first antenna port and the second antenna port are related to a distributed EPDCCH transmission.

6. A user equipment in a wireless communication system, the user equipment comprising:
a receiver; and
a processor configured to:
transmit uplink data to a base station, and
receive, from the base station, an acknowledgement (ACK)/non-acknowledgement (NACK) for the uplink data via an Enhanced Physical Hybrid automatic repeat request Indicator Channel (EPHICH) resource region in an Enhanced Physical Downlink Control Channel (EPDCCH) region,
wherein the EPHICH resource region is located in 1st, 5th, 8th, and 12th orthogonal frequency division multiplexing (OFDM) symbols,
wherein the EPHICH resource region includes first resource units (REs) excluding REs for a CRS port index 0 and a CRS port index 1 among REs included in the 1st, 5th, 8th, and 12th OFDM symbols,
wherein the EPHICH resource region includes second REs allocated to a first antenna port and third REs allocated to a second antenna port,
wherein the first antenna port and the second antenna port are allocated to available REs for the EPDCCH on a Physical Resource Block (PRB) pair except for the second REs and the third REs included in the first REs, and
wherein a difference between a number of the second REs and a number of the third REs is less than or equal to a predetermined value, if a Channel State Information-Reference Signal (CSI-RS) is transmitted on the PRB pair.

* * * * *